US009164719B2

(12) United States Patent
Kanamori

(10) Patent No.: US 9,164,719 B2
(45) Date of Patent: Oct. 20, 2015

(54) METHOD AND APPARATUS FOR OBTAINING STATUS INFORMATION FROM A DEVICE

(71) Applicant: CANON KABUSHIKI KAISHA, Tokyo (JP)

(72) Inventor: Hideyuki Kanamori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/934,328

(22) Filed: Jul. 3, 2013

(65) Prior Publication Data

US 2014/0009792 A1 Jan. 9, 2014

(30) Foreign Application Priority Data

Jul. 9, 2012 (JP) ................................ 2012-153706

(51) Int. Cl.
*H04L 9/32* (2006.01)
*G06F 3/12* (2006.01)

(52) U.S. Cl.
CPC ............ *G06F 3/1294* (2013.01); *G06F 3/1207* (2013.01); *G06F 3/1229* (2013.01); *G06F 3/1259* (2013.01); *G06F 3/1285* (2013.01)

(58) Field of Classification Search
CPC ... G06F 3/1259; G06F 3/1207; G06F 3/1294; G06F 3/1285; G06F 3/1229
USPC ............... 358/1.15, 1.13, 1.14; 370/232, 328, 370/329; 455/552.1; 704/236; 709/203, 709/206, 224, 232, 246; 710/36; 711/125, 711/126; 713/192; 714/16; 718/102; 725/16, 38; 726/2
See application file for complete search history.

(56) References Cited

U.S. PATENT DOCUMENTS

| 5,943,503 | A | 8/1999 | Kai |
| 6,906,811 | B1 * | 6/2005 | Teradaira et al. ............. 358/1.13 |
| 7,200,671 | B1 * | 4/2007 | Lev-Ami et al. .............. 709/232 |
| 2004/0255021 | A1 * | 12/2004 | Motoyama et al. ........... 709/224 |
| 2005/0021859 | A1 * | 1/2005 | Willian et al. ................ 709/246 |
| 2005/0090283 | A1 * | 4/2005 | Rodriquez ................. 455/552.1 |
| 2006/0197971 | A1 * | 9/2006 | Simpson et al. ............. 358/1.14 |
| 2007/0088869 | A1 * | 4/2007 | Kadota .......................... 710/36 |
| 2007/0206210 | A1 * | 9/2007 | Miyazaki et al. ............ 358/1.14 |
| 2008/0007771 | A1 | 1/2008 | Kanamori |
| 2008/0229025 | A1 * | 9/2008 | Plamondon ................... 711/126 |
| 2008/0297841 | A1 * | 12/2008 | Aoki ............................ 358/1.15 |

(Continued)

FOREIGN PATENT DOCUMENTS

| JP | H09-251356 A | 9/1997 |
| JP | 2005-196573 A | 7/2005 |

(Continued)

*Primary Examiner* — David S Cammack
(74) *Attorney, Agent, or Firm* — Canon U.S.A., Inc. IP Division

(57) ABSTRACT

When a print job is being processed in a print queue, a printer utility cannot update various statuses of a printer. To solve such a problem, an information processing method includes inputting, in the job management unit, a status acquisition job requesting to acquire a status of a printing apparatus and to store it in the status storing unit, inquiring the job management unit about the status stored in the status storing unit and acquiring it, acquiring a processing status of the status acquisition job, determining, based on the acquired status and the acquired processing status, whether to request cancelling of the status acquisition job, and requesting the job management unit to cancel the status acquisition job based on the determination result.

6 Claims, 15 Drawing Sheets

(56) References Cited

U.S. PATENT DOCUMENTS

| | | | |
|---|---|---|---|
| 2010/0097632 A1* | 4/2010 | Hattori | 358/1.15 |
| 2010/0161328 A1* | 6/2010 | Krumel et al. | 704/236 |
| 2011/0292895 A1* | 12/2011 | Wager et al. | 370/329 |
| 2012/0110063 A1* | 5/2012 | Prasad | 709/203 |
| 2013/0263169 A1* | 10/2013 | Pedlow et al. | 725/16 |

FOREIGN PATENT DOCUMENTS

| | | | | |
|---|---|---|---|---|
| JP | 2005196573 A | * | 7/2005 | G06F 3/12 |
| JP | 2008-015948 A | | 1/2008 | |

\* cited by examiner

CONFIRMING PRINTER STATUS.
PLEASE WAIT FOR A WHILE.

APPLYING SETTING.
PLEASE WAIT FOR A WHILE.

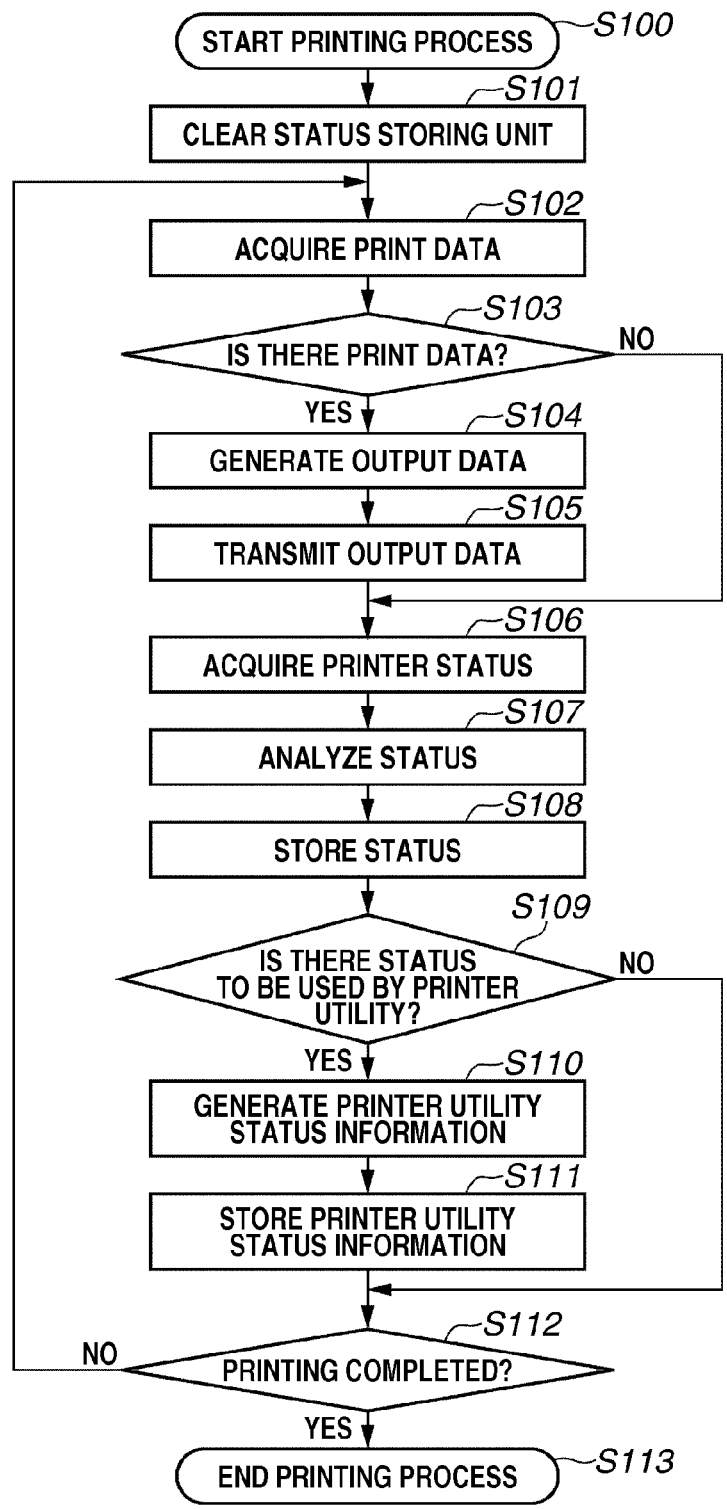

FIG.13

| PRINTER STATUS | PRINTER UTILITY STATUS INFORMATION |
|---|---|
| BLACK INK REMAINING AMOUNT | job-01-black-ink-level-70 |
| CYAN INK REMAINING AMOUNT | job-01-cyan-ink-level-100 |
| MAGENTA INK REMAINING AMOUNT | job-01-magenta-ink-level-30 |
| YELLOW INK REMAINING AMOUNT | job-01-yellow-ink-level-30 |
| AUTO POWER-OFF SETTING | job-01-auto-power-off-setting-30 |
| AUTO POWER-ON SETTING | job-01-auto-power-on-setting-off |

METHOD AND APPARATUS FOR OBTAINING STATUS INFORMATION FROM A DEVICE

BACKGROUND OF THE INVENTION

1. Field of the Invention

The present invention relates to a method for acquiring a status of a printing apparatus in a printing system.

2. Description of the Related Art

Conventionally, there is a printing system which manages print requests issued to a printer as jobs in a print queue, and sequentially processes the jobs. In such a printing system, a request to acquire the status of the printer is generally input to the print queue as a job, and the status is then acquired (refer to Japanese Patent Application Laid-Open No. 2005-196573).

A printer utility inputs to the print queue the job for requesting acquisition of the printer status (hereinafter referred to as a status acquisition job). The printer utility includes a function for displaying in a dialog, various statuses of the printer, such as a remaining amount of ink and an operation mode of the apparatus.

When the printer utility is to display the printer status in the dialog, the printer utility inputs the status acquisition job in the print queue. The status acquisition job then acquires the printer status and stores it in a specific cache. Upon completion of the status acquisition job, the printer utility refers to the status stored in the cache and displays the various statuses of the printer.

As described above, when displaying the various statuses of the printer, the printer utility inputs the status acquisition job in the print queue as necessary, so that a user is not aware that the job has been input. It is thus not desirable for such a status acquisition job, which is not intended by the user, to be remaining in the print queue over a long time.

Since the status acquisition job for only acquiring and storing the printer status can be processed in a short time, the job is normally processed immediately after being input to the print queue and then removed from the print queue. However, if the status acquisition job is input while a print job is being processed in the print queue, the status acquisition job is not processed until the print job is processed, and thus remains in the print queue for a long time.

SUMMARY OF THE INVENTION

The present invention is directed to an information processing method and an information processing apparatus capable of not remaining the status acquisition job in the print queue over a long time when another job is being processed in the print queue.

According to an aspect of the present invention, an information processing method performed by an information processing apparatus that includes a job management unit configured to manage a print queue in which jobs including requests to a printing apparatus are registered and a status storing unit configured to store a status of the printing apparatus, and acquire a status of the printing apparatus and store the status of the printing apparatus in the status storing unit when a job registered in the print queue is processed, includes inputting a status acquisition job requesting to acquire a status of the printing apparatus and to store the acquired status of the printing apparatus in the status storing unit, inquiring the job management unit about the status stored in the status storing unit and acquiring the status, acquiring a processing status by the job management unit of the status acquisition job input to the job management unit, determining, based on the acquired status and the acquired processing status, whether to request cancelling of the status acquisition job input to the job management unit, and requesting the job management unit to cancel the status acquisition job based on the determination result.

According to another aspect of the present invention, an information processing method performed by an information processing apparatus that includes a job management unit configured to manage a print queue in which jobs including requests to a printing apparatus are registered and a status storing unit configured to store a status of the printing apparatus, and acquire a status of the printing apparatus and store the status of the printing apparatus in the status storing unit when a job registered in the print queue is processed, includes inquiring the job management unit about a status stored in the status storing unit and acquiring the status, acquiring an operating status of the job management unit, determining, based on the acquired status and the acquired operating status, whether to input, to the job management unit, a status acquisition job requesting to acquire a status of the printing apparatus and to store the acquired state of the printing apparatus in the status storing unit, and inputting, based on the determination result, the status acquisition job to the job management unit.

According to the present invention, the status acquisition job is not remaining in the print queue over a long time when another job is being processed in the print queue.

Further features of the present invention will become apparent from the following detailed description of exemplary embodiments with reference to the attached drawings.

BRIEF DESCRIPTION OF THE DRAWINGS

FIGS. 4A and 4B illustrate dialogs displayed by a printer utility while processing is being performed.

FIG. 6 is a flowchart illustrating a printing process performed by a print filter in detail.

FIG. 13 illustrates a table indicating a configuration of the status information to be used by the printer utility (hereinafter, referred to as printer utility status information).

DESCRIPTION OF THE EMBODIMENTS

Various exemplary embodiments, features, and aspects of the invention will be described in detail below with reference to the drawings. It is to be understood that the invention is not limited to the exemplary embodiments to be described below. Further, it is not necessary to include all combinations of the features described in the exemplary embodiments, in the means of the present invention for solving the problems.

The configuration of the printing system according to the present exemplary embodiment will be described below with reference to the block diagram illustrated in FIG. 1.

Figure 1:
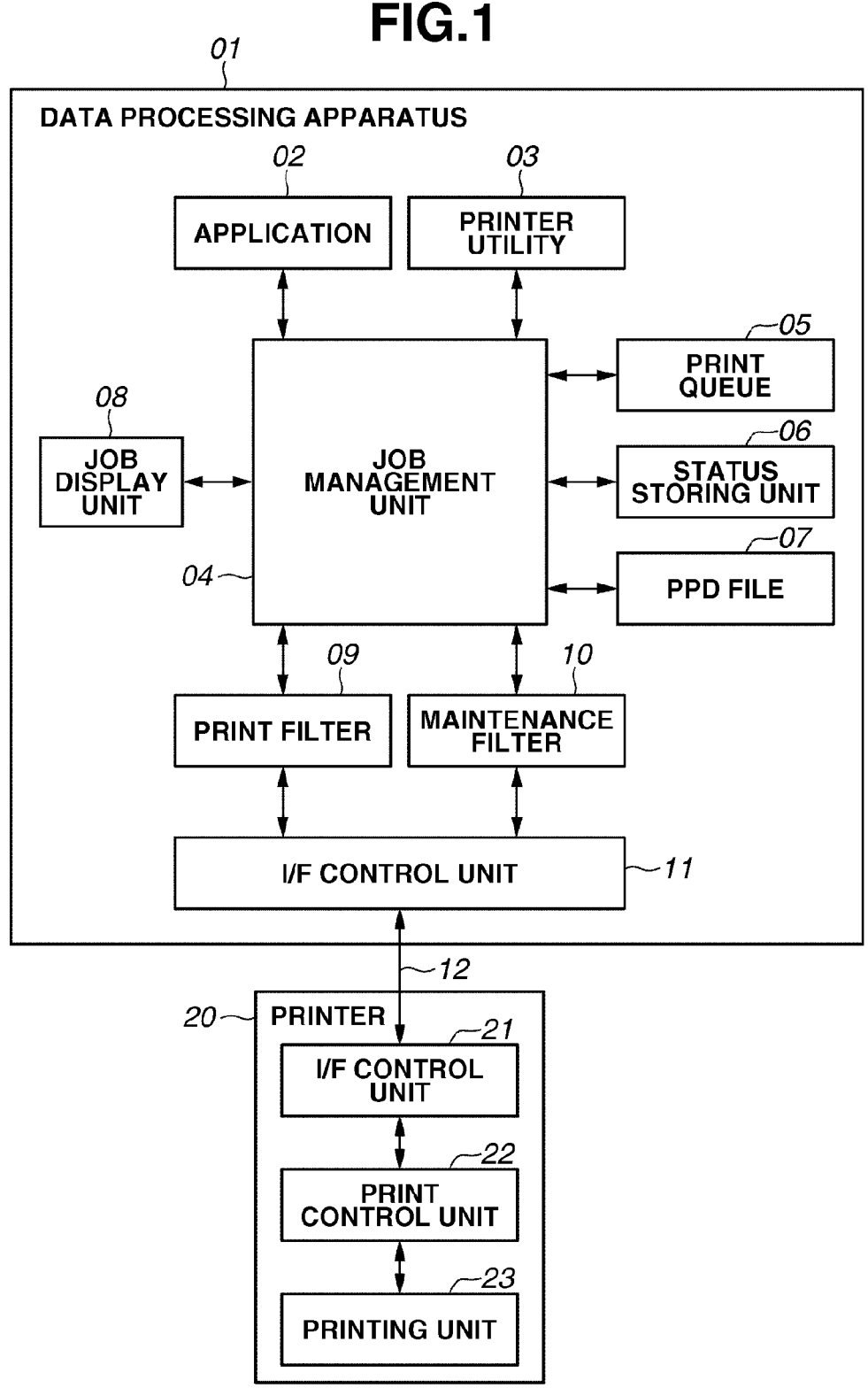
FIG. 1 is a block diagram illustrating a configuration of a printing system according to an exemplary embodiment of the present invention.

Referring to FIG. 1, a personal computer (PC) 01, i.e., a data processing apparatus, controls a printer 20, i.e., a printing apparatus. It is assumed that an operating system (OS) of the PC 01 is MacOS (registered trademark) X. Resources of the PC 01, such as blocks in the PC, are managed by the OS (not illustrated).

The PC 01 has a hardware configuration included in a general information processing apparatus. More specifically, the PC 01 includes a central processing unit (CPU), a read-only memory (ROM), a hard disk, a random access memory (RAM), and various device controllers. The CPU executes programs such as the OS and applications stored in a program ROM or loaded from the hard disk to the RAM. The processes of the flowcharts to be described below are realized by the CPU executing the programs.

Further, the RAM functions as a main memory and a work area of the CPU. Furthermore, the PC 01 includes a keyboard, a cathode ray tube (CRT) display, and a disk controller (DKC) which controls data access to the hard disk (HD) and a flexible disk (FD) storing various data. Moreover, the PC 01 includes a communication control unit which controls exchange of signals between the PC 01 and a connected printer.

The PC 01 includes an application 02, a printer utility 03, a job management unit 04, a print queue 05, a status storing unit 06, a PPD file 07, a job display unit 08, a print filter 09, a maintenance filter 10, and an interface (I/F) control unit 11. According to the present exemplary embodiment, it is assumed that a print control system of the OS is a common UNIX (registered trademark) printing system (CUPS) included in the MacOS X, so that CUPS controls the job management unit 04, the print queue 05, and the status storing unit 06.

Further, it is assumed that the I/F control unit 11 is a backend in CUPS which communicates with the printer 20. Information on values that can be set and initial setting values of various printing functions are described on the PPD file 07. The application 02 thus requests, from the job management unit 04, the above-described information, acquires it, and performs print setting.

If the user requests printing of the data generated using the application 02, the request and the data are input to the job management unit 04 as a print job. The job management unit 04 then assigns a number (hereinafter referred to as a job identification (ID)) for identifying each received job, registers the job in the print queue 05, and sequentially retrieves and processes the job.

Upon retrieving the print job from the print queue 05, the job management unit 04 transmits the print data to the print filter 09. The print filter 09 then converts the received print data into output data, and transmits the output data to the printer 20 via the I/F control unit 11.

Then, the job management unit 04 monitors the status of the printer 20 until the printer 20 completes printing. While monitoring the status of the printer 20, the print filter 09 regularly stores or updates, in the status storing unit 06, the status acquired from the printer 20 via the I/F control unit 11. The status is stored by notifying the job management unit 04 of the status, and the job management unit 04 stores the notified status in the status storing unit 06.

The job display unit 08 requests from the job management unit 04 a list of the jobs stored in the print queue 05 and the status stored in the status storing unit 06. The job display unit 08 then displays the job list and the status of the printer 20 which is processing the job, on the dialog.

The application 02 updates the information described in the PPD file for reflecting the various print setting values used by the user in performing printing, in the print settings of other applications.

More specifically, the application 02 updates the initial value of the various print function settings described in the PPD file 07. The application 02 thus sets as the initial setting value in other application, the print setting value the user has used in printing by employing an appropriate application.

If the application 02 requests updating the initial setting values of the various print functions, the request and a PPD update command indicating the request is input to the job management unit 04 as a PPD update job. The job management unit 04 then retrieves the PPD update job from the print queue 05 and transmits the PPD update command to the maintenance filter 10.

Upon receiving the PPD update command, the maintenance filter 10 updates the PPD file based on the command. The maintenance filter 10 updates the PPD file by notifying the job management unit 04 of the setting information to be updated, and the job management unit 04 then updates the PPD file 07 based on the notified information.

On the other hand, the printer utility 03 includes functions for setting the dialog which displays the various settings of the printer and the operation mode of the printer. If the user opens the dialog for displaying the printer status, the printer utility 03 requests acquisition of the status, and the status acquisition job including the status request command indicating the request is input to the job management unit 04.

The job management unit 04 retrieves the status acquisition job from the print queue 05, and transmits the status request command to the maintenance filter 10. Upon receiving the status request command, the maintenance filter 10 acquires the status from the printer 20 via the I/F control unit 11. The maintenance filter 10 then stores in the status storing unit 06 the printer utility status information which is necessary for displaying the dialog of the printer utility 03, based on the acquired status.

The maintenance filter 10 stores the printer utility status information by notifying the job management unit 04 of the printer utility status information to be set, similarly as when storing the status. The job management unit 04 thus stores in the status storing unit 06 the notified printer utility status information.

The printer utility 03 requests from the job management unit 04 the status stored in the status storing unit 06, and displays the status in the dialog based on the printer utility status information included in the status. Further, if the user requests setting of the operation mode, the request and an operation mode setting command indicating the request are input to the job management unit 04 as an operation setting job.

The job management unit 04 retrieves the operation setting job from the print queue 05, and transmits the operation mode setting command to the maintenance filter 10. Upon receiving the operation mode setting command, the maintenance filter 10 converts the received command into a setting control command, and transmits the setting control command to the printer 20 via the I/F control unit 11.

A communication I/F 12 illustrated in FIG. 1 connects the PC 01 and the printer 20. It is assumed that the communication I/F 12 is a universal serial bus (USB) as a local interface.

The printer 20 includes an I/F control unit 21, a print control unit 22, and a printing unit 23. The printer 20 receives the output data from the PC 01 and transmits the status thereof to the PC 01 via the printer I/F control unit 21. The print control unit 22 controls the printing unit 23 based on the output data transmitted from the PC 01 and the operation control command.

According to the present exemplary embodiment, an example which provides the print filter, the printer utility, and the maintenance filter that operate in cooperation with CUPS included in the Mac OS will be described below.

Figure 2:
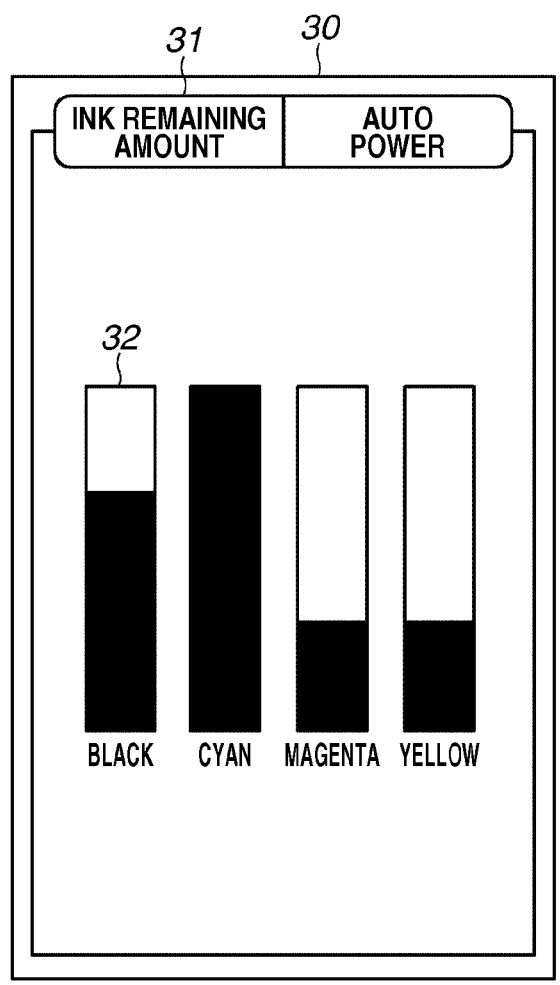
FIG. 2 illustrates an operation dialog of a printer utility.

FIG. 2 illustrates the operation dialog of the printer utility. Referring to FIG. 2, when the printer utility 03 is activated, the printer utility 03 displays an operation dialog 30.

The user can switch the dialog of the printer utility 03 using a tab menu 31. If the user selects "ink remaining amount" on the tab menu 31, the printer utility 03 displays an ink remaining amount dialog 32 indicating levels of the remaining amounts of inks loaded in the printer. Further, if the user selects "auto-power", the printer utility 03 indicates a setting status of an auto-power function of the printer 20 illustrated in FIG. 3, and displays an auto-power dialog for performing such setting.

The printer utility 03 displays the ink remaining amount dialog 32 immediately after being activated. When displaying the ink remaining dialog 32, the printer utility 03 inputs the status acquisition job to the job management unit 04. The printer utility 03 then displays a status acquiring dialog 50 illustrated in FIG. 4A while acquiring the printer utility status information on the remaining amount of ink in the printer 20, stored in the status storing unit 06.

Upon acquiring the printer utility status information, the printer utility 03 closes the status acquiring dialog 50, and displays on the dialog 32 the remaining amounts of the various types of ink loaded in the printer 30 based on the acquired information. According to the present exemplary embodiment, the printer 20 includes black, cyan magenta, and yellow inks, and the printer utility 03 acquires and displays the printer utility status information on the remaining amounts of the inks.

Figure 3:
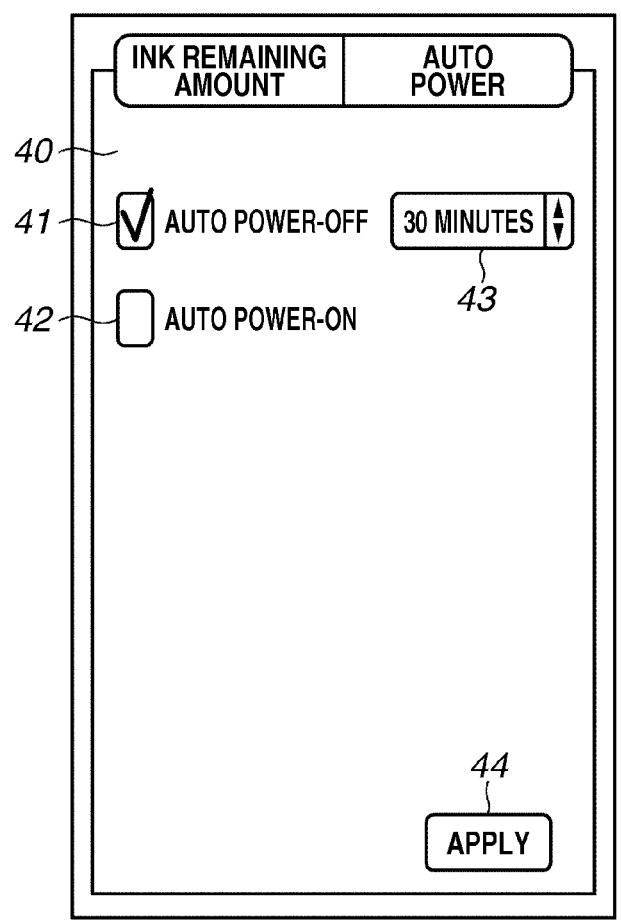
FIG. 3 illustrates an operation dialog of a printer utility.

FIG. 3 illustrates an auto-power dialog displayed by the printer utility 03. Referring to FIG. 3, when the user selects "auto-power" on the tab menu 31, the printer utility 03 displays an auto-power dialog 40. The user can set an auto-power-off function of the printer 20 using an auto-power-off checkbox 41 and a time select pop-up menu 43.

The auto-power-off function is a function for automatically switching the power off when the user has not used the printer 20 for a specific length of time. The user can set whether to enable the function using the auto-power-off checkbox 41, and the specific length of time until the power is switched off using the time select pop-up menu 43. According to the present exemplary embodiment, the user can select one of 15 minutes, 30 minutes, or 60 minutes.

Further, the user can set an auto-power-on function of the printer 20 using an auto-power-on check box 42. The auto-power-on function is a function for automatically switching on the power when the printer is switched off. If the printer 20 receives from the PC 01 the output data and the setting command when the auto-power-on function is enabled, the printer 20 is automatically switched to an on state.

The user can set whether to enable the auto-power-on function using the auto-power-on checkbox 42. Further, the user can set the printer 20 to the operation mode set using the auto-power dialog 40 by pressing an apply button 44. Upon the user pressing the apply button 44, the printer utility 03 inputs the operation setting job to the job management unit 04.

The printer utility 03 then displays an operation setting dialog 60 illustrated in FIG. 4B while the job is being processed. When the job has been processed, the printer utility 03 closes the operation setting dialog 60, and returns the display to the auto-power dialog 40.

When displaying the auto-power dialog 40, the printer utility 03 inputs the status acquisition job to the job management unit 04 similarly as in the case of displaying the ink remaining amount dialog 32. The printer utility 03 then displays the status acquiring dialog 50 illustrated in FIG. 4A while acquiring the printer utility status information on an auto-power setting status of the printer 20, stored in the status storing unit 60.

After the printer utility status information has been acquired, the printer utility 03 closes the status acquiring dialog 50. The printer utility 03 thus reflects the auto-power setting status of the printer 20 in the values of the various checkboxes and the pop-up menu in the dialog based on the acquired information.

FIGS. 4A and 4B illustrate dialogs displayed by the printer utility 03 while processing is being performed. The printer utility 03 displays the status acquiring dialog 50 illustrated in FIG. 4A while acquiring the printer utility status information.

More specifically, when displaying the ink remaining amount dialog 32 or the auto-power dialog 40, the printer utility 03 inputs the status acquisition job to the job management unit 04 and displays the status acquiring dialog 50.

Upon acquiring from the status storing unit 04 the printer utility status information which is necessary for displaying the dialog, the printer utility 03 closes the displayed dialog, and displays a dialog based on the acquired information.

The printer utility 03 displays the operation setting dialog 60 illustrated in FIG. 4B when the utility 03 is setting the operation mode of the printer 20. Upon the user pressing the apply button 44 on the auto-power dialog 40, the printer utility 03 inputs the operation setting job to the job management unit 04 and displays the operation setting dialog 60. After the input job has been processed, the printer utility 03 closes the operation setting dialog 60 and returns the display to the auto-power dialog 40.

Figure 5A:
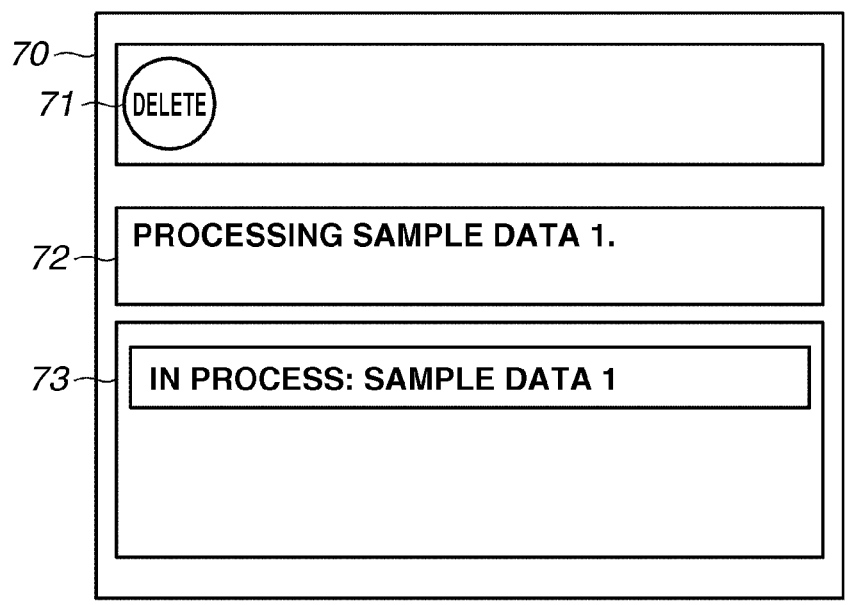
FIGS. 5A and 5B illustrate dialogs displayed by a job display unit.
Figure 5B:
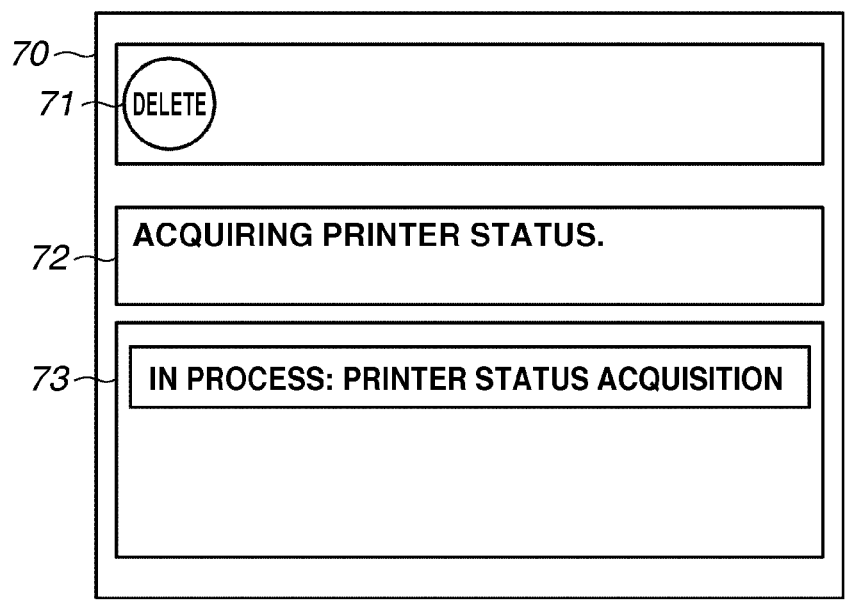

FIGS. 5A and 5B illustrate dialogs displayed by the job display unit 08. Referring to FIGS. 5A and 5B, the job display unit 08 displays a list of the jobs stored in the print queue 05 on a job display area 73 in a job display dialog 70. The user can request the job management unit 04 using a job delete button 71 to cancel the job selected on the job display area 73.

The job management unit 04 removes the job from the print queue 05 in response to the cancel request. The job display unit 08 displays on a status display area 72 the status of the printer 20 stored in the status storing unit 06. The status of the printer 20 is stored in the status storing unit 06 by the print filter 09 or the maintenance filter 10, which is performing the process.

FIG. 5A illustrates a dialog displayed when the application 02 has input the print job including sample data 1. Referring to FIG. 5A, the print job of the sample data 1 is highlighted in the job display area 73 to indicate that the job is being processed, and the status stored by the print filter 09 is displayed in the status display area 72.

FIG. 5B illustrates a dialog displayed when the printer utility 03 has input the status acquisition job. Referring to FIG. 5B, the status acquisition job is highlighted in the job display area 73 to indicate that the job is being processed, and the status stored by the maintenance filter 10 is displayed in the status display area 72.

FIG. 6 is a flowchart illustrating the printing process performed by the print filter 09 in detail. Upon receiving the print job from the application 02, the job management unit 04 transmits the data on which printing has been requested to the print filter 09, and the print filter 09 starts performing the process in step S100.

In step S101, the print filter 09 once clears the old status and the printer utility status information stored in the status storing unit 06.

If the old status is remaining in the status storing unit 06, the job display unit 08 displays the previous job processing status which is not related to the job currently being processed. The job display unit 08 displays such a status from when the print filter 09 starts processing a new job to when storing the status. The print filter 09 thus clears the previous job processing status when the print filter 09 starts processing a new job.

On the other hand, if printing is being performed, the printer utility 03 refers to the printer utility status information which is updated by the print filter 09. The process performed by the printer utility 03 will be described below.

If the old status is remaining in the status storing unit 06, the printer utility 03 displays the various printer statuses based on the old printer utility status information stored when the previous job has been performed. The printer utility displays such a status until the print filter 09 updates the printer utility status information.

As a result, upon starting processing, the print filter 09 also clears the printer utility status information. Further, since the maintenance filter 10 similarly performs the process as will be described below, the maintenance filter 10 clears the status and the printer utility status information of the previously processed job when starting processing.

The print filter 09 clears the old status and the printer utility status information in the status storing unit 06 by notifying the job management unit 04 of clearing the status. The job management unit 04 thus clears the status storing unit 06 according to the notification for instructing to clear the status storing unit 06.

In step S102, the print filter 09 acquires from the job management unit 04 the print data in band units. In step S103, the print filter 09 determines whether there is the print data. If the print filter 09 determines that there is the print data (YES in step S103), the processing proceeds to step S104. In step S104, the print filter 09 generates the output data based on the print data. In step S105, the print filter 09 transmits the generated output data to the printer 20. Then, the processing proceeds to step S106.

If the print filter 09 determines that there is no print data (NO in step S103), the processing proceeds to step S106 without the print filter 09 generating and transmitting the print data.

In step S106, the print filter 09 acquires the status from the printer 20. In step S107, the print filter 09 analyzes the acquired status. In step S108, the print filter 09 stores the status in the status storing unit 06. The printer filter performs the processes of step S106 to step S108 until the printer 20 completes printing.

Further, while the printer 20 is printing, the print filter 09 stores the printer utility status information in the status storing unit 06, so that the printer utility 03 can display the ink remaining amount dialog 32 and the auto-power dialog 40.

In step S109, the print filter 09 determines whether the status on the ink remaining amount or the auto-power setting is included in the previously acquired status. If the status on the ink remaining amount or the auto-power setting is included (YES in step S109), the processing proceeds to step S110. In step S110, the print filter 09 generates the printer utility status information based on the included status. In step S111, the print filter 09 stores the generated printer utility status information in the storing unit 06. In such a case, the job ID of the job is added to the printer utility status information. The configuration of the printer utility status information will be described below.

If the status necessary for the printer utility 03 to display the dialog is not included (NO in step S109), the processing proceeds to step S112.

In step S112, the print filter 09 determines whether printing has been completed based on the status of the printer 20 acquired in step S106. If printing has not been completed (NO in step S112), the processing returns to step S102. If printing has been completed (YES in step S112), the processing ends in step S113.

Figure 7:
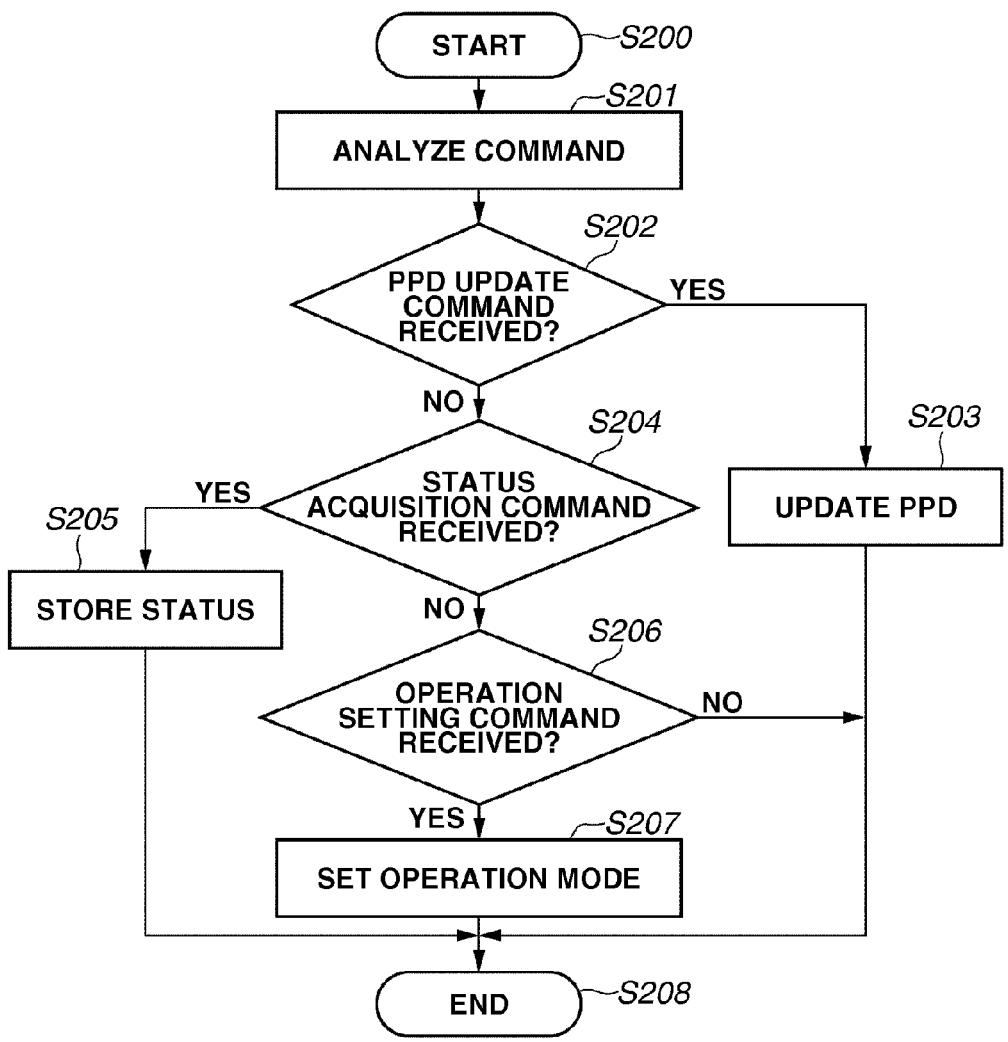
FIG. 7 is a flowchart illustrating a process performed by a maintenance filter.

FIG. 7 is a flowchart illustrating a process performed by the maintenance filter 10.

The job management unit 04 receives the PPD update job input by the application 02 for updating the initial setting values of the various print functions described in the PPD file. Further, the job management unit 04 receives the status acquisition job input by the printer utility 03 for acquiring the ink remaining amount or the auto-power setting status. Furthermore, the job management unit 04 receives the operation setting job input by the printer utility 03 for setting the auto-power operation mode to the printer. Upon receiving such a job, the job management unit 04 transmits the command indicating the request to the maintenance filter 10, and the maintenance filter 10 starts performing processing in step S200.

In step S201, the maintenance filter 10 analyzes the command received from the job management unit 04, and determines the request. If the maintenance filter 10 determines that the received command is the PPD update command (YES in step S202), the processing proceeds to step S203. In step S203, the maintenance filter 10 updates the PPD. In step S208, the processing ends.

If the maintenance filter 10 determines that the received command is the status acquisition command (YES in step S204), the processing proceeds to step S205. In step S205, the maintenance filter 10 stores the printer utility status information. In step S208, the processing ends.

If the maintenance filter 10 determines that the received command is the operation mode setting command (YES in step S206), the processing proceeds to step S207. In step S207, the maintenance filter 10 sets the operation mode. In step S208, the processing ends. If the maintenance filter 10 determines that the received command is none of the above-described commands, the processing ends without the maintenance filter 10 performing the process.

Figure 8:
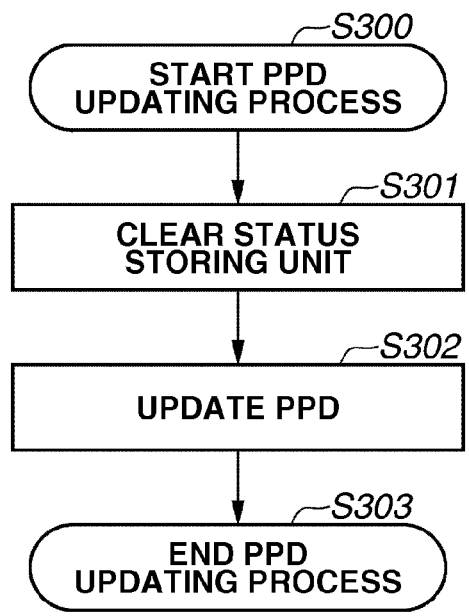
FIG. 8 is a flowchart illustrating a postscript printer description (PPD) updating process in detail.

FIG. 8 is a flowchart illustrating a PPD updating process performed by the maintenance filter 10 in detail.

The maintenance filter 10 starts in step S300 the PPD updating process in step S203 illustrated in FIG. 7. In step S301, the maintenance filter 10 once clears the old status and the printer utility status information remaining in the status storing unit 06, similarly as the print filter 09. In step S302, the maintenance filter 10 updates the PPD file 07. The processing then ends in step S303.

The maintenance filter 10 updates the PPD file 07 by notifying the job management unit 04 of the setting information to be updated. The job management unit 04 thus updates the PPD file 07 based on the notified information.

Figure 9:
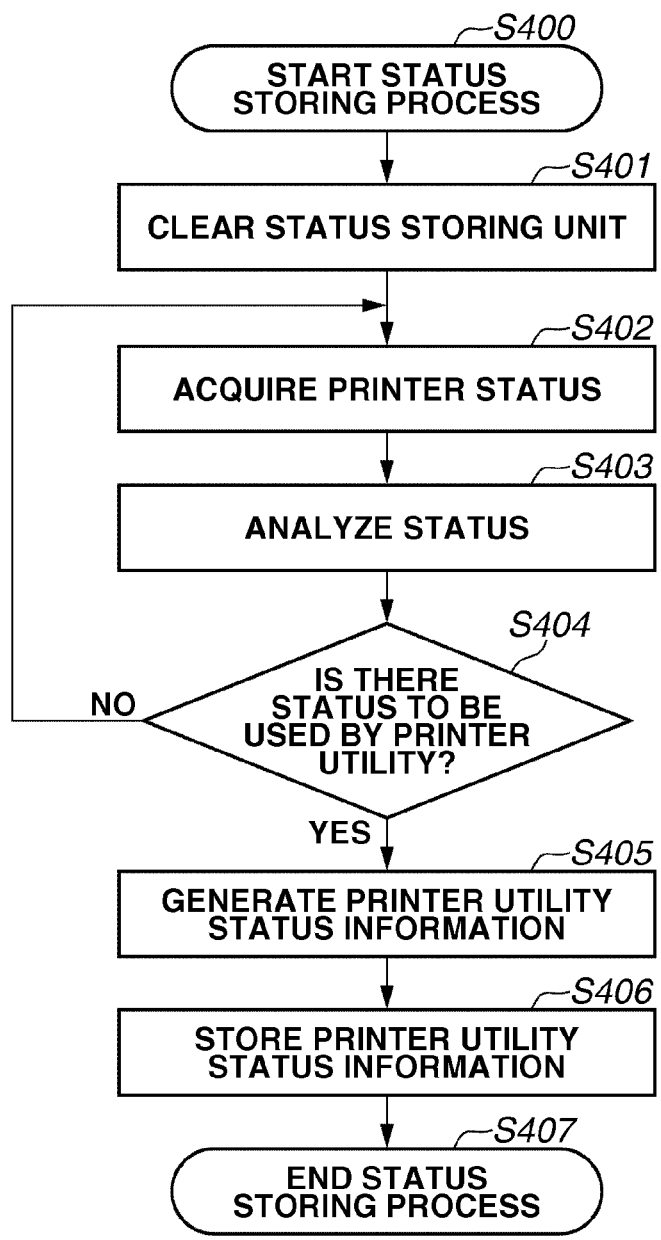
FIG. 9 is a flowchart illustrating a process for storing status information to be used by a printer utility in detail.

FIG. 9 is a flowchart illustrating the process for storing the printer utility status information performed by the maintenance filter 10 in detail.

The maintenance filter 10 starts in step S400 the process for storing the printer utility status information in step S205 illustrated in FIG. 7. In step S401, the maintenance filter 10 once clears the old status and the printer utility status information remaining in the status storing unit 06, similarly as the print filter 09. In step S402, the maintenance filter 10 acquires the status from the printer 20. In step S403, the maintenance filter 10 analyzes the acquired status.

In step S404, the maintenance filter 10 determines whether the acquired status includes the status necessary for the printer utility 03 to display the dialog. According to the present exemplary embodiment, it is assumed that the status on the ink remaining amount and the printer utility status information on the auto-power setting status are to be stored. In step S404, the maintenance filter 10 thus determines whether such statuses of the printer are included.

If the statuses are not included (NO in step S404), the processing returns to step S402, and the maintenance filter 10 re-acquires the status from the printer 20. If the statuses are included (YES in step S404), the processing proceeds to step S405. In step S405, the maintenance filter 10 generates the printer utility status information based on the acquired status. In such a case, the job ID of the job is added to the printer utility status information.

More specifically, the printer utility 03 can determine, by adding the job ID to the job, whether the job storing the printer utility status information is the job input thereby. The process for acquiring the printer utility status information performed by the printer utility 03 will be described below.

In step S406, the maintenance filter 10 stores the printer utility status information in the status storing unit 06, and the processing ends in step S407.

Figure 10:
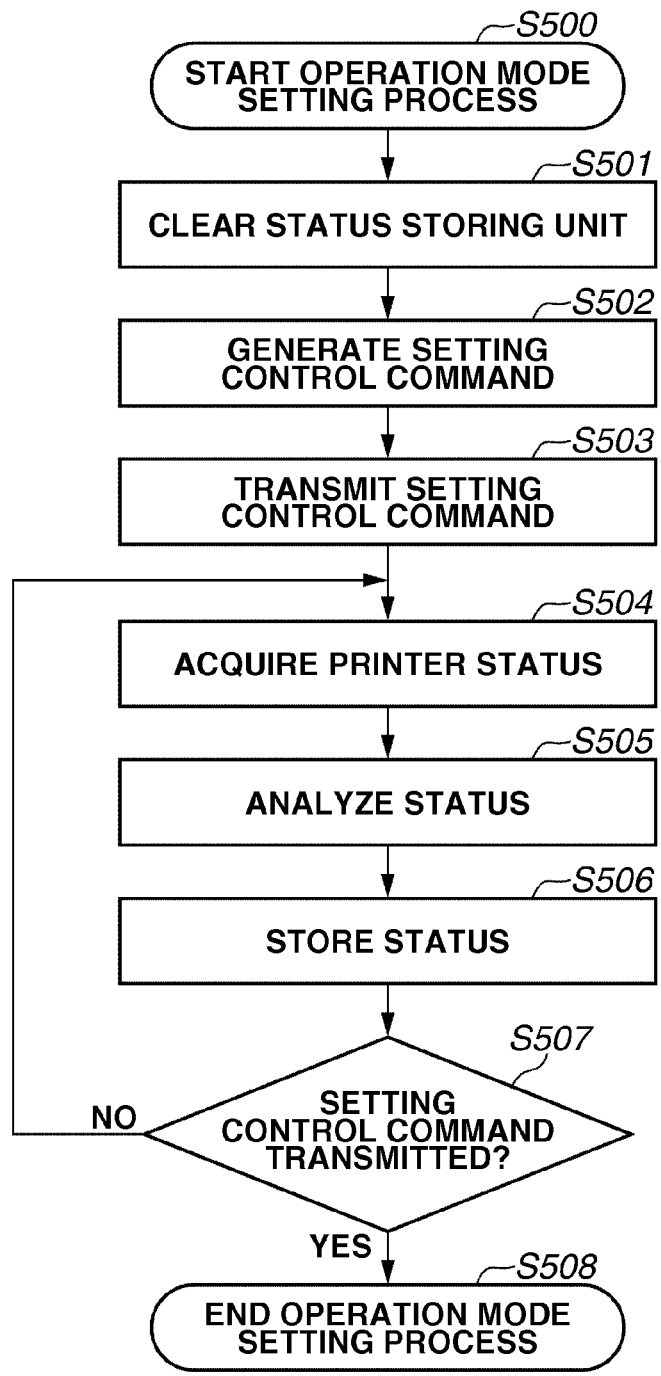
FIG. 10 is a flowchart illustrating an operation mode setting process in detail.

FIG. 10 is a flowchart illustrating the process for setting the operation mode performed by the maintenance filter 10 in detail.

The maintenance filter 10 starts in step S500 the process for setting the operation mode in step S207 illustrated in FIG. 7. In step S501, the maintenance filter 10 once clears the old status and the printer utility status information remaining in the status storing unit 06, similarly as the print filter 09. In step S502, the maintenance filter 10 converts the operation mode setting command received from the job management unit 04 into the setting control command. In step S503, the maintenance filter 10 transmits the setting control command to the printer 20.

In step S504, the maintenance filter 10 acquires the status from the printer 20. In step S505, the maintenance filter 10 analyzes the acquired status. In step S506, the maintenance filter 10 stores the analyzed status in the status storing unit 06. The maintenance filter repeats the processes of step S504 to step S506 until the setting control command has been transmitted.

For example, if an error occurs in the printer 20 and the setting control command is not transmitted, the maintenance filter 10 stores the status indicating such a status. The job display unit 08 then displays such a status in the status display area 72 illustrated in FIGS. 5A and 5B.

In step S507, the maintenance filter 10 determines whether the setting control command has been transmitted based on the status of the printer acquired in step S504. If the setting control command has been transmitted (YES in step S507), the processing ends in step S508.

Figure 11:
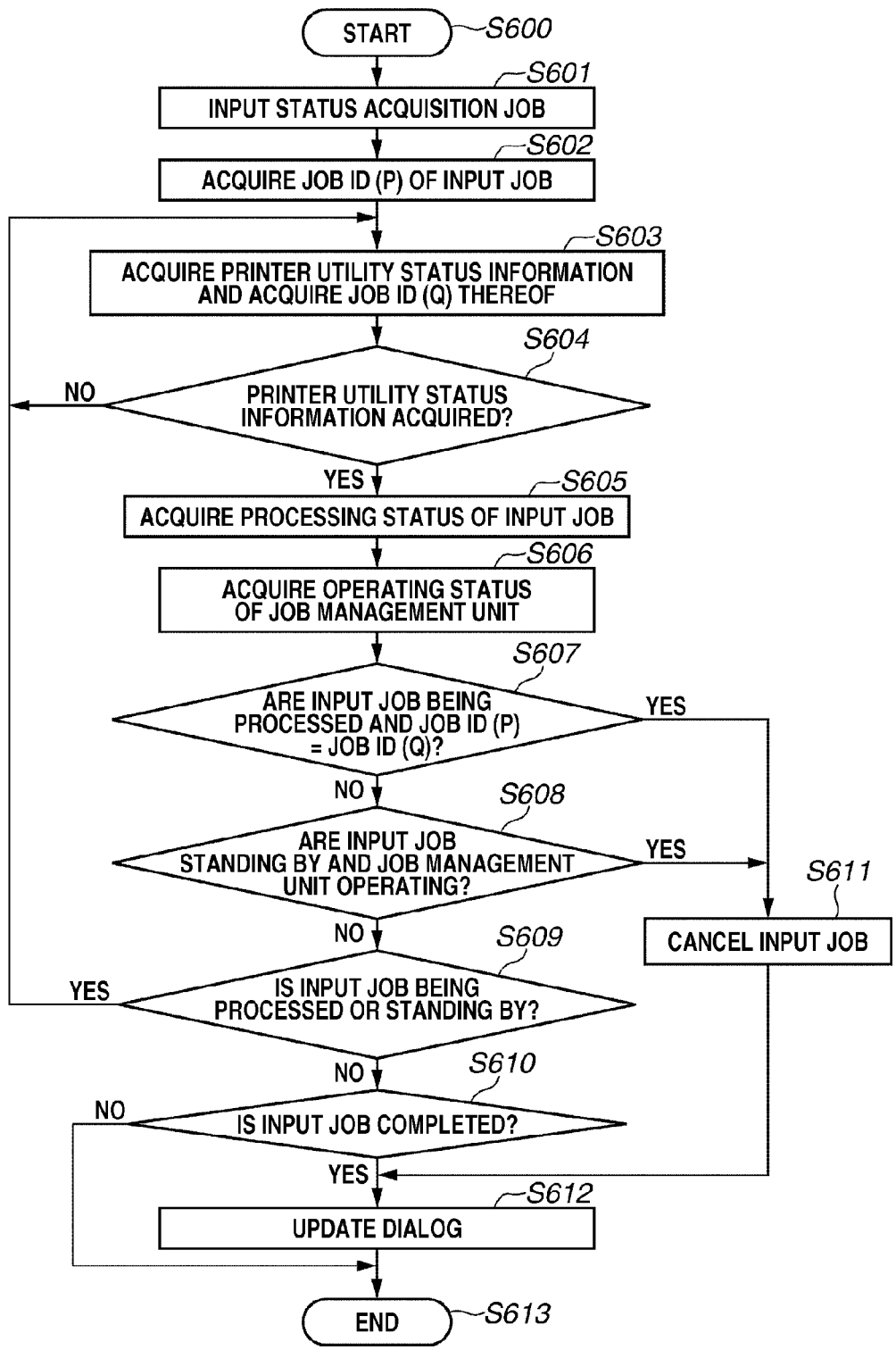
FIG. 11 is a flowchart illustrating a status information acquisition process.

FIG. 11 is a flowchart illustrating an outline of a process for acquiring the status information performed by the printer utility 03.

When the printer utility 03 is to display the ink remaining amount dialog 32 or the auto-power dialog 40, the printer utility 03 acquires the printer utility status information by performing the process to be described below, and displays each dialog based on the information. According to the present exemplary embodiment, an example in which the ink remaining amount dialog 32 is to be displayed will be described below.

Upon the user activating the printer utility 03 or selecting the ink remaining amount on the tab menu, the process starts in step S600. In step S601, the printer utility 03 inputs the status acquisition job to the job management unit 04.

More specifically, the printer utility 03 displays while the job input thereby is being processed or standing by, the dialog 50 illustrated in FIG. 4A indicating that the status is being acquired. The job management unit 04 retrieves the status acquisition job, and transmits the status request command to the maintenance filter 10. The maintenance filter 10 acquires and converts the status of the printer 20 into the printer utility status information, and stores it in the status storing unit 06.

In step S602, the printer utility 03 requests from the job management unit 04 the job ID (P) of the status acquisition job input thereby and acquires it. In step S603, the printer utility 03 inquires at the job management unit 04 about the status stored in the status storing unit 06, and acquires the printer utility status information included in the stored status.

Since a job ID (Q) is respectively assigned to the pieces of acquired printer utility status information, the job storing each of the pieces of the status information can be identified. The configuration of the printer utility status information will be described below.

In step S604, the printer utility 03 determines whether the acquired printer utility status information includes the status on the ink remaining amount. If the printer utility 03 is to display the auto-power dialog 40, the printer utility 03 determines whether the acquired printer utility status information includes the status on the auto-power setting status. If the printer utility 03 determines that the acquired printer utility status information does not include the status on the ink remaining amount (NO in step S604), the processing returns to step S603. The printer utility 03 then re-requests, from the job management unit 04, the status stored in the status storing unit 06 and acquires it.

If the printer utility 03 determines that the acquired printer utility status information includes the status on the ink remaining amount (YES in step S604), the processing proceeds to step S605.

In step S605, the printer utility 03 inquires at the job management unit 04 about the processing status of the job ID (P) acquired in step S602, i.e., the processing status of the job input thereby, and acquires it.

In step S606, the printer utility 03 inquires at the job management unit 04 about the operating status of the job management unit 04 and acquires it. If the printer utility 03 determines in step S607 and step S608 to be described below that the job input thereby is not necessary even when the job is being processed or standing by, the printer utility 03 requests the job management unit 04 to cancel the job.

More specifically, in step S607, the printer utility 03 determines whether the printer utility status information on the ink remaining amount has been stored while the job input thereby is being processed. If the printer utility 03 determines that the printer utility status information on the ink remaining amount has been stored while the job input thereby is being processed (YES in step S607), the processing proceeds to step S611. In step S611, the printer utility 03 determines that the job input thereby is unnecessary and requests cancelling the job. In step S612, the printer utility 03 updates the ink remaining amount dialog 32 based on the acquired printer utility status information. In step S613, the processing ends.

The printer utility 03 determines whether the job input thereby has stored the printer utility status information on the ink remaining amount by determining as follows. The printer utility determines whether the job ID (P) acquired in step S602 is the same as the job ID (Q) added to the printer utility status information on the ink remaining amount acquired in step S603.

If the printer utility 03 requests the job management unit 04 to cancel the job input thereby in step S611, the job management unit 04 cancels and removes the job being processed from the print queue 05.

In step S608, the printer utility 03 determines whether the job management unit 04 is operating while the job input thereby is standing by. If the printer utility 03 determines that the job management unit 04 is operating while the job input thereby is standing by (YES in step S608), the printer utility 03 determines that the job input thereby is unnecessary. According to the present exemplary embodiment, the jobs not input from the printer utility 03 include the print job and the PPD update job. If the print filter 09 is performing printing, the printer utility status information is regularly updated.

On the other hand, if the maintenance filter 10 is executing the PPD update job, the status storing unit 06 is only cleared, and does not store the printer utility status information.

If the status storing unit 06 stores the printer utility status information on the ink remaining amount, and the job management unit 04 is processing another job, it can be assumed that the print filter 09 is regularly updating the printer utility status information. As a result, the maintenance filter 10 determines that the status acquisition job input thereby is unnecessary (YES in step S608). The processing proceeds to step S611, and the maintenance filter requests cancelling the job.

In step S612, the printer utility 03 updates the ink remaining amount dialog 32 based on the previously acquired printer utility status information. Then, in step S613, the processing ends. In step S609, the printer utility 03 determines whether the job input thereby is being processed or standing by. If the printer utility 03 determines that the job input thereby is being processed or standing by, the processing returns to step S603.

In step S610, the printer utility 03 determines whether the job input thereby has been completed. If the printer utility 03 determines that the job input thereby has been completed (YES in step S610), the processing proceeds to step S612. In step S612, the printer utility 03 updates the ink remaining amount dialog 32 based on the previously acquired printer utility status information, and in step S613, the processing ends.

If the printer utility 03 determines that the job input thereby has not been completed, i.e., the job has been cancelled (NO in step S610), the processing ends without updating the dialog 32 in step S612.

For example, if the user instructs, by using the delete button 71 on the job display dialog 70 illustrated in FIGS. 5A and 5B, to delete the job before the status acquisition job has been completed, the printer utility 03 determines in step S610 that the job has been cancelled. Then, the processing ends.

Figure 12:
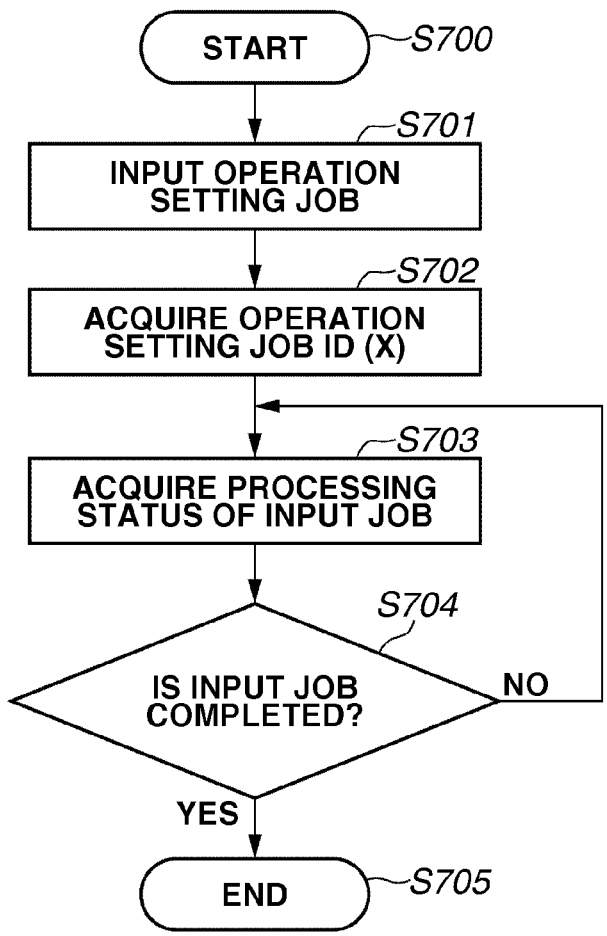
FIG. 12 is a flowchart illustrating an outline of the operation mode setting process.

FIG. 12 is a flowchart illustrating an outline of an operation mode setting process performed by the printer utility 03.

Upon the user pressing the apply button 44 in the auto-power dialog 40, the process starts in step S700. In step S701, the printer utility 03 inputs the operation setting job to the job management unit 04. Further, the printer utility 03 displays the dialog 60 illustrated in FIG. 4B, which indicates that the operation mode is being set, while the job input thereby is being processed or standing by.

The job management unit 04 retrieves the operation setting job, and transmits the operation mode setting command to the maintenance filter 10 and processes it. In step S702, the printer utility 03 acquires a job ID (X) of the operation setting job input thereby.

In step S703, the printer utility 03 requests, from the job management unit 04, the processing status of the job ID (X) acquired in step S702, i.e., the processing status of the job input thereby and acquires it.

In step S704, the printer utility 03 determines whether the job input thereby has been completed. If the printer utility 03 determines that the job input thereby is being processed or standing by (NO in step S704), the processing returns to step S703. If the printer utility 03 determines that the job input thereby has been completed (YES in step S704), the processing proceeds to step S705, and the processing ends.

FIG. 13 is a table illustrating a configuration of the printer utility status information stored by the print filter 09 or the maintenance filter 10.

Referring to FIG. 13, the status information on the ink remaining amount includes information on the job ID, a type of tank, and a level of the remaining amount. The job ID indicates the identification number assigned by the job management unit 04 to each job. The type of tank indicates the tank included in the printer. According to the present exemplary embodiment, the type of tank indicates one of black, cyan, magenta, and yellow tank included in the printer. The level of the remaining amount indicates the remaining amount of ink in the tank, i.e., a value between 0% and 100%.

The status information on the auto-power setting status includes the information indicating the job ID, a type of function, and the setting status. The job ID indicates the identification number assigned by the job management unit 04 to each job. The type of function indicates the auto-power function included in the printer according to the present exemplary embodiment, i.e., one of the auto-power-off function and the auto-power-on function.

The setting status indicates the setting status of each function. In the case of the auto-power-off function, the setting status indicates one of an off state, 15 minutes, 30 minutes, and 60 minutes. In the case of the auto-power-on function, the setting status indicates one of the off state and the on state.

Figure 14A:
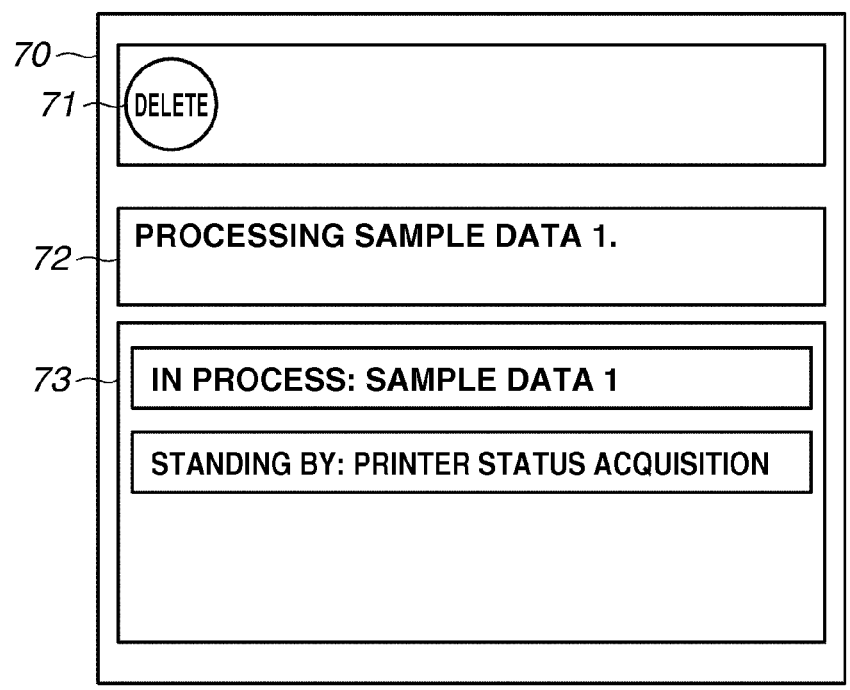
FIGS. 14A and 14B illustrate transitions of the job display dialog.
Figure 14B:
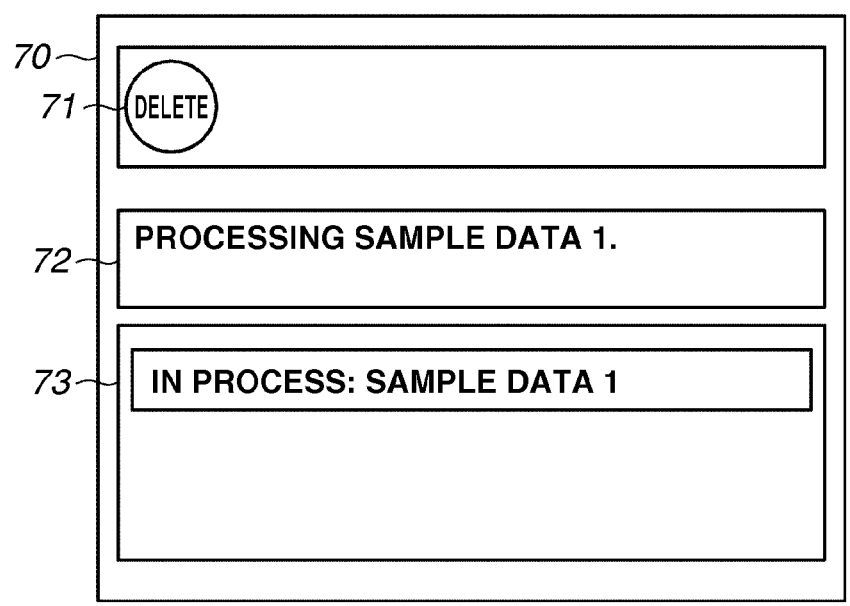

FIGS. 14A and 14B illustrate transition of the job display dialog 70. If the user activates the printer utility 03 while the job management unit 04 is processing the print job, the printer utility 03 inputs the status acquisition job to the job management unit 04. As a result, the job display area 73 in the job display dialog 70 displays the print job and the status acquisition job as illustrated in FIG. 14A.

According to the present exemplary embodiment, the print filter 09 is regularly storing the printer utility status information which is necessary for the printer utility 03 to display the ink remaining amount dialog 32 (i.e., step S111 illustrated in FIG. 6). On the other hand, the maintenance filter 10 acquires the above-described printer utility status information stored in the status storing unit 06 (i.e., step S603 illustrated in FIG. 11).

In such a case, the status acquisition job input by the printer utility 03 is not yet being processed by the job management unit 04 and is standing by. However, the job management unit 04 is processing the print job and is in the operating state. As a result, the printer utility 03 determines that the job input thereby is unnecessary (i.e., YES in S608 illustrated in FIG. 11), requests cancelling the job (i.e., step S611 illustrated in FIG. 11), and displays the ink remaining amount dialog 32 based on the status information stored by the print filter 10 (i.e., step S612 and step S613 illustrated in FIG. 11).

According to the present exemplary embodiment, the job management unit 04 receives the request to cancel and then removes the status acquisition job. The status acquisition job thus disappears from the job display area 73 in the job display dialog 70 as illustrated in FIG. 14B.

As described above, according the first exemplary embodiment, the user of the printing system can confirm the ink remaining amount and the auto-power setting status using the printer utility even when the print job is being processed in the print queue. Further, the status acquisition job which has been input independent of the user's intention is cancelled and thus does not remain on the job display unit.

A second exemplary embodiment of the present invention will be described below. According to the first exemplary embodiment, if the printer utility 03 determines that the status acquisition job is unnecessary after inputting the job, the printer utility 03 cancels the job. According to the second exemplary embodiment, the printer utility 03 determines whether it is necessary to input the status acquisition job before inputting the job.

According to the present exemplary embodiment, the configuration of the printing system, the dialog displayed by the printer utility 03, and the configurations of the job display unit 08, the maintenance filter 10, the print filter 09, and the printer utility status information are similar to those of the first exemplary embodiment. The description thereof will thus be omitted. Further, since the operation mode setting process performed by the printer utility 03 is similar to that of the first exemplary embodiment, the description thereof will be omitted.

Figure 15:
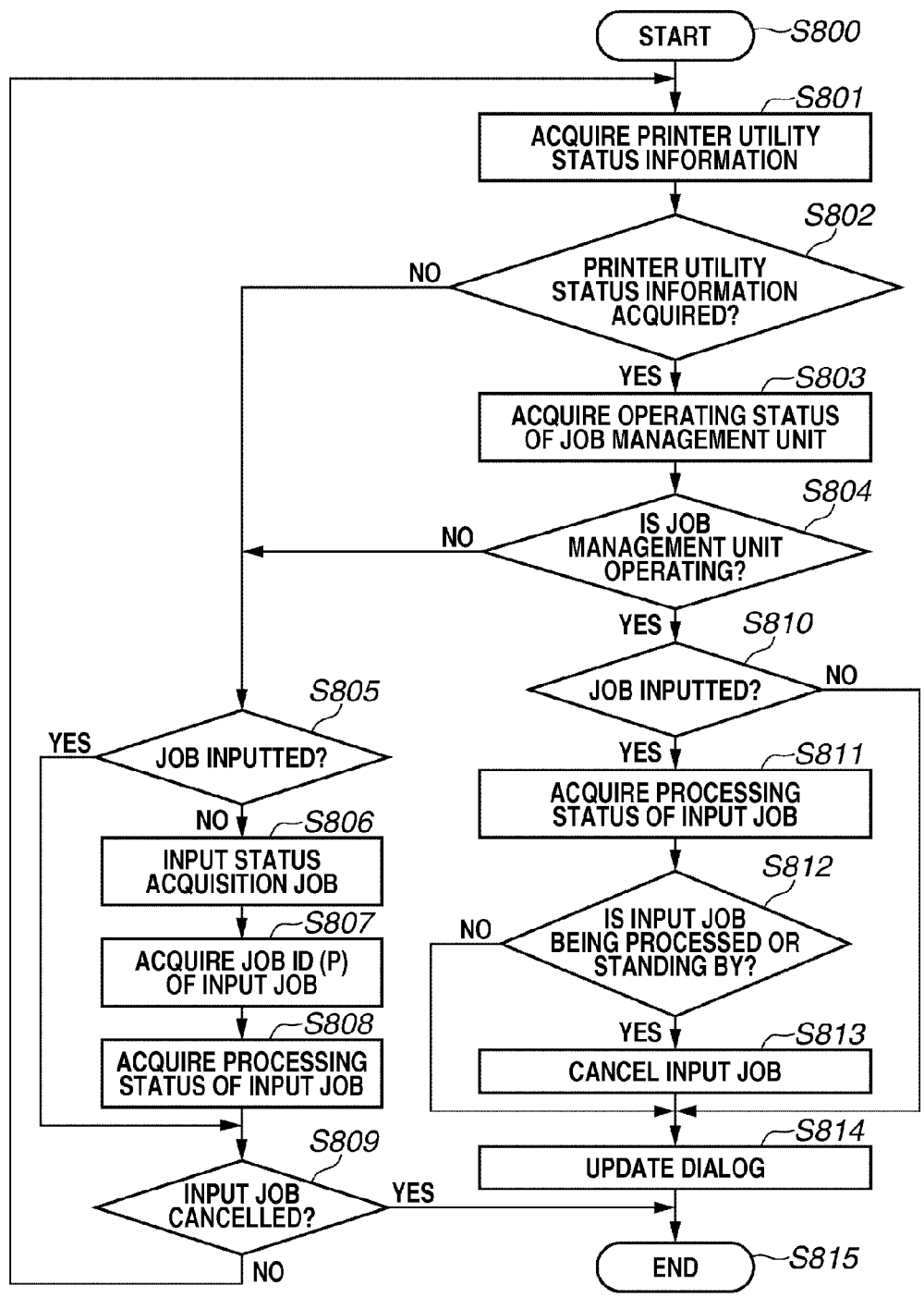
FIG. 15 is a flowchart illustrating in detail a process for storing printer utility status information.

FIG. 15 is a flowchart illustrating a status information acquisition process performed by the printer utility 03.

When the printer utility 03 is to display the ink remaining amount dialog 32 or the auto-power dialog 40, the printer utility 03 acquires the printer utility status information by performing the process to be described below, and displays each dialog based on the information. According to the present exemplary embodiment, an example in which the ink remaining amount dialog 32 is to be displayed will be described below.

Upon the user activating the printer utility 03 or selecting the ink remaining amount on the tab menu 31, the process starts in step S800. The printer utility 03 determines whether to input the status acquisition job based on whether the printer utility status information is stored in the status storing unit 06, and the operating status of the job management unit 04.

If the printer utility status information is not stored in the status storing unit 06, the printer utility 03 inputs the status acquisition job. The printer utility status information is not stored in the status storing unit 06 in the initial state immediately after the user has registered in the job management unit 04 the printer 20 to be used and the job management unit 04 has newly prepared the print queue 05 and the status storing unit 06 for the printer 20.

Further, the printer utility status information is not stored in the status storing unit 06 between when the print filter 09 has cleared the status storing unit 06 and when the print filter 09 has stored the new printer utility status information. Furthermore, the printer utility status information is not stored in the status storing unit 06 after the maintenance filter 10 has updated the PPD. In such cases, the printer utility 03 inputs the status acquisition job.

Moreover, the printer utility 03 inputs the status acquisition job when the job management unit 04 is not operating even when the printer utility status information is stored.

The previous printer utility status information, previously stored by the print job or the status acquisition job, may be remaining in the status storing unit 06. If the job management unit 04 is not operating, the printer utility status information in the status storing unit 06 is not regularly updated and is thus old. The printer utility 03 thus inputs the status acquisition job and updates the printer utility status information.

On the other hand, if the printer utility status information is stored and the job management unit 04 is operating, the printer utility 03 does not input the status acquisition job.

According to the present exemplary embodiment, the jobs not input by the printer utility 03 include the print job and the PPD update job. If the print filter 09 is performing printing, the printer utility status information is regularly updated.

On the other hand, if the maintenance filter 10 is executing the PPD update job, the status storing unit 06 is only cleared, and does not store the printer utility status information.

If the status storing unit 06 stores the printer utility status information, and the job management unit 04 is processing another job, it can be assumed that the print filter 09 is regularly updating the printer utility status information. As a result, the printer utility 03 determines that the status acquisition job is unnecessary and does not input the status acquisition job.

In step S801, the printer utility 03 requests, from the job management unit 04, the status stored in the status storing unit 06, and acquires the printer utility status information included in the stored status.

In step S802, the printer utility 03 determines whether the acquired printer utility status information includes the status on the ink remaining amount. If the printer utility 03 is to display the auto-power dialog 40, the printer utility 03 determines whether the acquired printer utility status information includes the status on the auto-power setting status.

If the printer utility 03 determines that the acquired printer utility status information does not include the status on the ink remaining amount (NO in step S802), and the status acquisition job has not yet been input, the printer utility 03 inputs the status acquisition job (S805 and S806). If the printer utility 03 determines that the acquired printer utility status information includes the status on the ink remaining amount (YES in step S802), the processing proceeds to step S803. In step S803, the printer utility 03 inquires at the job management unit 04 about the operation status and acquires said operation status.

If the printer utility 03 determines that the job management unit 04 is not yet operating (NO in step S804), and the printer utility 03 has not yet input the status acquisition job, the printer utility 03 inputs the status acquisition job. In step S805, the printer utility 03 determines whether the status acquisition job has been input. If the status acquisition job has not yet been input (NO in step S805), the processing proceeds to step S806. In step S806, the printer utility 03 inputs the status acquisition job.

The printer utility 03 displays the dialog 50 illustrated in FIG. 4A indicating that the status is being acquired while the job input thereby is being processed or standing by. When the printer utility 03 inputs the status acquisition job to the job management unit 04, the job management unit 04 retrieves the status acquisition job, and transmits the status request command to the maintenance filter 10. The maintenance filter 10 acquires the status of the printer 20 and converts it into the printer utility status information, and stores the status information in the status storing unit 06.

In step S807, the printer utility 03 requests, from the job management unit 04, the job ID (P) of the status acquisition job input thereby and acquires it. In step S808, the printer utility 03 requests, from the job management unit 04, the processing status of the job ID (P) acquired in step S807, i.e., the processing status of the job input thereby and acquires it.

In step S809, the printer utility 03 determines whether the job input thereby has been cancelled. If the printer utility 03 determines that the job input thereby has been cancelled (YES in step S809), the processing proceeds to step S815, and the processing ends without updating the dialog. For example, if the user instructs, on the job display dialog 70 illustrated in FIGS. 5A and 5B, to delete the job before the status acquisition job has been completed, the printer utility 03 determines in step S809 that the job has been cancelled. Then, the processing ends.

If the printer utility 03 determines that the job input thereby has not been cancelled (NO in step S809), the processing returns to step S801, and the printer utility 03 re-acquires the printer utility status information.

If the printer utility 03 determines that the job management unit 04 is operating (YES in step S804), the processing proceeds to step S810. In step S814, the printer utility 03 updates the ink remaining dialog 32 based on the printer utility status information acquired in step S802. In step S815, the processing ends.

According to the present exemplary embodiment, if the printer utility 03 has input a job, and the job is being processed or standing by, the printer utility 03 updates the ink remaining dialog 32 after cancelling the job and ends the processing.

More specifically, in step S810, the printer utility 03 determines whether the status acquisition job has been input. If the status acquisition job has been input (YES in step S810), the processing proceeds to step S811. In step S811, the printer utility 03 requests, from the job management unit 04, the processing status of the job ID (P) acquired in step S807, i.e., the processing status of the job input thereby and acquires it.

In step S812, the printer utility 03 determines whether the job input thereby is being processed or standing by. If the printer utility 03 determines that the job input thereby is being processed or is standing by (YES in step S812), the processing proceeds to step S813. In step S813, the printer utility 03 cancels the job. If the printer utility 03 determines that the job input thereby is not being processed or standing by (NO in step S812), i.e., the job is completed, the processing proceeds to step S814. In step S814, the printer utility 03 updates the ink remaining dialog 32 based on the printer utility status information acquired in step S802. In step S815, the processing ends.

As described above, according the second exemplary embodiment, the user of the printing system can confirm the ink remaining amount and the auto-power setting status using the printer utility even when the print job is being processed in the print queue. Further, since the status acquisition job is not input, a job is not displayed on the job display unit independent of the user's intention.

According to the above-described exemplary embodiments, the printing system is not a single apparatus and is configured by the PC and the printer connected by a specific bi-directional interface. However, it is not limited thereto, and may be a printing system in which the functions of the PC and the printer are integrated into one apparatus.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-153706 filed Jul. 9, 2012, which is hereby incorporated by reference herein in its entirety.

What is claimed is:

1. An information processing method performed by an information processing apparatus capable of communicating with a printing apparatus, the method comprising:

inputting a status acquisition job requesting the acquisition of a status of the printing apparatus;

determining whether processing based on a print job different from the status acquisition job is being performed; and requesting cancelling of the status acquisition job, in a case where it is determined that the processing based on the print job different from the status acquisition job is being performed, wherein a status of the printing apparatus obtained by the processing based on the print job is displayed.

2. The information processing method according to claim 1, wherein the information processing apparatus determines whether status information requested by the status acquisition job is stored, and wherein the information processing apparatus determines, based on at least one of a determination result indicating that status information requested by the status acquisition job is stored and a determination result indicating that the processing based on the print job is being performed, whether to request cancelling of the status acquisition job.

3. The information processing method according to claim 2, wherein the information processing apparatus determines, in a case where identification information of the status acquisition job and identification information of a status of the printing apparatus match each other, that status information requested by the status acquisition job is stored.

4. The information processing method according to claim 1, wherein the information processing apparatus includes a job management unit configured to manage a print queue in which jobs including requests to the printing apparatus are registered, wherein the information processing apparatus notifies, in a case where a job of the printing apparatus is to be processed, a status of the printing apparatus after notifying the job management unit of clearing a status.

5. A non-transitory computer-readable storage medium storing a program for causing a computer to perform the information processing method according to claim 1.

6. An information processing apparatus capable of communicating with a printing apparatus, the information processing apparatus comprising:
- a job input unit configured to input a status acquisition job requesting the acquisition of a status of the printing apparatus;
- a determination unit configured to determine whether processing based on a print job different from the status acquisition job is being performed; and
- a cancelling unit configured to request cancelling of the status acquisition job, in a case where it is determined that the processing based on the print job different from the status acquisition job is being performed,
- wherein a status of the printing apparatus obtained by the processing based on the print job is displayed, and
- wherein at least one of the job input unit, the determination unit and the cancelling unit is executed by a CPU.

* * * * *